United States Patent [19]
Phelps et al.
[11] 4,254,165
[45] Mar. 3, 1981

[54] METHOD OF FORMING A FILLED POLYMER COATING ON AN INTERNAL CYLINDRICAL SURFACE AND ARTICLE PRODUCED THEREBY

[75] Inventors: Edwin H. Phelps; William E. Snow, both of Birmingham, Ala.

[73] Assignee: American Cast Iron Pipe Company, Birmingham, Ala.

[21] Appl. No.: 856,241

[22] Filed: Nov. 30, 1977

[51] Int. Cl.$^3$ .......................... B05D 7/22; B05D 3/00; B32B 1/08

[52] U.S. Cl. .................................... 427/183; 427/181; 427/184; 427/195; 427/201; 427/234; 427/239; 427/240; 427/299; 428/36; 427/318

[58] Field of Search ................. 428/36, 331, 461, 334; 138/141, 143, 145, 146, DIG. 7; 427/181, 195, 183, 230, 231, 239, 184, 201, 234, 240, 299, 318

[56] References Cited

U.S. PATENT DOCUMENTS

| | | | |
|---|---|---|---|
| Re. 24,601 | 2/1959 | Lewis | 117/96 |
| 3,186,860 | 6/1965 | Jones | 117/18 |
| 3,307,996 | 3/1967 | Keneipp, Jr. | 156/287 |
| 3,488,206 | 1/1970 | Munder et al. | 427/195 |
| 3,498,827 | 3/1970 | Vanderbilt et al. | 138/145 |
| 3,666,528 | 5/1972 | Barnhardt | 117/49 |
| 3,974,306 | 8/1976 | Inamura et al. | 427/183 |
| 3,982,050 | 9/1976 | Kato et al. | 427/181 |
| 4,007,298 | 2/1977 | Feehan | 427/195 |

*Primary Examiner*—Paul J. Thibodeau
*Attorney, Agent, or Firm*—Kerkam, Stowell, Kondracki & Clarke

[57] ABSTRACT

A filled, low or medium density polyethylene or other polyolefin composition is used to form a polymer coating on an internal cylindrical metal surface such as, for example, the interior surface of a pipe.

17 Claims, No Drawings

METHOD OF FORMING A FILLED POLYMER COATING ON AN INTERNAL CYLINDRICAL SURFACE AND ARTICLE PRODUCED THEREBY

BACKGROUND OF THE INVENTION

This invention relates generally to a method of preparing coated articles and to the articles produced thereby, and more particularly to an improved method of applying polyolefin polymer or copolymer coatings to internal, cylindrical metal surfaces to provide articles having strongly adherent protective coatings off polyolefin, particularly polyethylene.

DESCRIPTION OF THE PRIOR ART

Many articles, particularly metal articles such as sheet metal and pipes, are coated with resinous materials to improve the surface characteristics thereof and to protect the material of the body of the article from corrosive environments.

Polyethylene has been used to provide such a coating and has found use in many applications; however, a strongly adhesive polyethylene coating on metal surfaces, particularly curved metal surfaces, is difficult to achieve. Known methods of coating the interior surfaces of pipe produce coatings which are not dependable over long periods of time because the coatings are subject to cracking or stripping which exposes the substrate or body of the article to the corrosive environment in which the article is used.

Numerous attempts have been made to improve the adhesion between polyethylene coatings and metal surfaces which have had limited degrees of success. However, in all known prior methods for improving the adhesion of polyethylene to metals, there is generally required the use of various chemicals or a complex chemical process for surface preparation of the metal, the application of a primer coat, and curing of the final coating. For example, to overcome the effect of cracking in high density polyethylene coatings on steel pipes which occurs due to stresses, it has been proposed to use an adhesive mastic layer between the polyethylene coating and the pipe. Although the use of such a mastic layer permits movement of the polyethylene coating without cracking, this method has the disadvantage that the polyethylene coating is easily stripped from the steel plate.

Another procedure which has improved the adhesion of polyethylene to metals involves the application of a molecular film of stearic acid to the metal substrate before the polyethylene coating is applied. Although the adhesion of the polyethylene coating is improved, this process has the disadvantage of being costly, time consuming and difficult to control.

In U.S. Pat. No. 3,057,746, the material to be coated is first pre-treated by the application of an epoxy resin and then coated with a layer of polyethylene which has previously been subjected to chlorination. Such a method increases considerably the cost of obtaining an effective coating due to the additional materials utilized and the chemical process necessary for preparation of the materials.

Another procedure which has improved the adhesion of polyethylene to metals involves providing the metal surface with a thin layer of high density polyethylene to which is then bonded a thicker layer of low or medium density polyethylene. The thin layer of high density polyethylene serves as a primer coat or adhesive for the thicker layer of low or medium density polyethylene. This procedure is described in detail in U.S. Pat. No. 3,348,995.

Still another method for laminating olefin polymers to metal is described in U.S. Pat. No. 3,565,747 wherein a preformed solid film of polyolefin containing solid, non-deformable polymer particles is laminated to a metal surface utilizing heat and pressure.

U.S. Pat. No. 3,468,753 discloses that the degree of adhesion of ethylene-ethylenically unsaturated carboxylic acid copolymers can be substantially increased by incorporating into the adhesive copolymer finely divided inorganic particles.

Inasmuch as coated pipes are frequently used in processes or locations which render them inaccessible to inspection and which require the handling of extremely abrasive and corrosive materials, it is important that such coatings be resistant to corrosive and abrasive materials and have long life. Known procedures for coating internal surfaces of pipes for use in such environments have not been entirely satisfactory.

It is believed that the bond between polyethylene coatings and the internal surfaces of a pipe is subject to peeling and/or cracking or other failure due to the residual stresses set up in the coating upon cooling of the pipe and the differential between the coefficients of thermal expansion of the pipe and coating. It is further believed that increased peel strength characteristics can be imparted to the coating by the use of filler materials which modify the shrink characteristics of the coating and application of the coating to a rotating pipe which holds the coating against the surface of centrifugal force while simultaneously forming a thin film or lining between the surface of the pipe and the particles to thereby impart thin film characteristics to the overall coating.

SUMMARY OF THE INVENTION

The above and other features of the present invention are accomplished by coating the internal, cylindrical, metal surfaces with protective polyolefin or olefin copolymer coatings by:

(a) providing a homogenous mixture of particles of a low or medium density polyethylene or other olefin polymer or copolymer and particles of a filler within the space defined by the internal, cylindrical, metal surface which is rotating about its longitudinal axis at a speed sufficient to hold the mixture of particles against the said internal, cylindrical, metal surface which is rotating about its longitudinal axis, the said internal, metal surface being at a temperature above the melting point of the polymer or copolymer;

(b) uniformly depositing the mixture of particles on the hot, rotating, internal metal surface at a rate such that the mixture is held substantially stationary at the point of deposition with respect to the internal metal surface by the centrifugal force of the rotating cylindrical surface whereby the polymer or copolymer component of the mixture melts to form a viscous, filled film which remains substantially stationary with respect to the internal metal surface by reason of the said centrifugal force; and (c) cooling the coating to a temperature below the melting point of the polymer or copolymer.

The resulting composite article comprising a hollow, cylindrical metal article coated on its internal surface with a low or medium density polyethylene or other olefin polymer or copolymer having homogeneously distributed therein particles of a filler may be employed in a wide variety of applications without danger of cracking or stripping of the coating from the internal surface.

DETAILED DESCRIPTION OF THE INVENTION

The invention enables the production of relatively thick coatings of olefin polymers and copolymers on the internal surfaces of pipes, etc. Heretofore, it has generally been assumed that adhesion of these types of polymers to metal surfaces is directly related to the film thickness, i.e., the adhesion decreases as the film thickness increases. It has been found that the unique combination of steps hereinabove disclosed and the utilization of filler particles in the low or medium density polyethylene or other olefin polymer or copolymer provides certain synergistic qualities to coatings applied to internal cylindrical surfaces and gives a higher degree of adhesion than heretofore achieved. While not wishing to be bound by any particular theory or mechanism, it is hypothesized that the high degree of adhesion of the relatively thick films of filler containing olefin polymers and copolymers is due to the change in shrinkage characteristics of the olefins and the consequent reduction of tensile stresses during cooling and the relatively thin film of polymer which exists between the individual filler particles and the metal surface itself. The filler particles act as an extension of the metal surface itself thereby insuring a thin film at the polymer/metal or particle interface.

However, it is to be understood that in addition to the utilization of filler particles, it is also necessary to deposit the coating on the internal metal surface in the manner heretofore set forth.

The method of the invention is particularly suited for forming low or medium density polyethylene coatings on the interior surfaces of pipes since the prior art is faced with unique problems in forming polyethylene coatings on interior, cylindrical, metal surfaces not shared by other olefin polymers or copolymers. However, it is to be understood that the method of the invention is also suitable for forming coatings of other olefin polymers or copolymers on the interior surfaces of pipes, etc.

The invention is applicable to low or medium density polyethylene or any suitable olefin polymer or copolymer. A low or medium density polyethylene is one having a density from 0.910 to 0.940 and a melt index of from 0.2 to 25. Suitable olefin polymers include polypropylene, etc., and olefin copolymers such as ethylene-vinyl acetate copolymers, ethylene-acrylic acid copolymers and ethyleneethyl acrylate polymers.

Any metal normally employed for the preparation of pipes and similar hollow, cylindrical articles may be coated according to the present invention. Suitable among such metals are aluminum, steel, copper, cast iron and ductile or spheroidal graphite iron.

Any suitable filler material may be utilized in the method of the invention, so long as the filler is substantially inert with respect to the polymer and resistant to corrosive attack by the environment in which the coated surface is to be employed. Virtually any solid particulate material whose melt point is higher than the olefin polymer or copolymer may be utilized according to the present invention. Suitable such fillers in particulate form include the oxides of silicon, aluminum, magnesium, iron, chrome, etc.; silicates such as dicalcium silicate, zirconium silicate, etc.; carbides such as tungsten carbide, silicon carbide, etc.; metals such as iron, copper, aluminum, chromium, stainless steel, etc.; natural minerals such as sand, limestone, clay, bentomite, granite, iron ore, etc.; man-made materials such as crushed fire brick, slag cement, glass, etc. The limitations with respect to the filler are that it should not decompose or melt at a temperature below the application temperature of the coating and it should not react with the material transported.

The particle size of the olefin polymer or copolymer may vary from about 10 mesh to about 325 mesh, but is preferably about 50 mesh.

The particle size of the filler material should be such that it may be homogeneously blended with the particulate polymer. Generally, the particle size of the filler may range from about 4 mesh to about 325 mesh, but preferably is about 50 mesh. It will be understood that thin coatings normally require a finer particle size than would thicker coatings and a high melt index material requires a finer particle size than a low melt index material.

Generally, the mixture of the invention is applicable for the production of coatings having a thickness in the range of about 0.005 inch to about 0.5 inch, preferably from about 0.020 inch to about 0.060 inch. It is to be understood, however, that the ultimate thickness of the coating is not overly critical and that the method of the invention is applicable for the production of coatings of any suitable thickness.

The ratio of polymer or copolymer to filler is critical in that the amount of filler dictates the degree of adhesion to the metal surface. Generally, as the percentage of filler increases, the degree of adhesion increases. However, the amount of filler should not be increased to the point that there is insufficient polymer or copolymer to form a strongly adherent bond between the various particles and the metal surface. Generally, the weight ratio of polymer or copolymer to filler is in the range of from about 1:2 to about 10:1.

A further limitation on the amount of filler employed is dictated by the application to which the coated pipe is to be utilized. As the amount of filler is increased, the flow coefficient of the coated surface is decreased due to friction between the effluent and filler particles in the coated surface. Accordingly, the amount of filler material must be adjusted according to the degree of adhesion desired and the application to which the coated surface is to be put.

For example, a sewer main lining must resist sulphurous and sulphuric acid corrosion, must have a reasonable flow coefficient and have a fair resistance to abrasion. For such an application, it has been found that a mixture containing low density polyethylene and about 25% by weight of sand, based on the weight of the mixture, is most advantageous for forming a protective coating.

Sand in greater amounts (up to 50% by weight) has been successfully employed; however, the coating results in greater surface roughness and an increae of head loss due to friction (lowered flow coefficient). There are some applications, however, such as low velocity gravity flow sewer lines where the increase in friction is not a detriment and the high sand content mixes would be acceptable either as a means of increasing the total thickness of the lining or as a means of reducing the overall cost thereof.

Another example of the versatility in selecting the inert filler would be for applications such as ash handling lines at coal fired steam generating plants. At such plants, ash which is a constituent of all coals is liquified in the firing operation and drips to the bottom where it is quenched with water and carried by pipes under pressure to large selection ponds. The ash is not only highly abrasive, but also contains sulphur which is picked up by thhe water and converted to acid. For such applications, the inert filler must necessarily be highly abrasive resistant and the polyolefin or olefin copolymer and filler both resistant to sulphurous and sulphuric acid. Fillers for such applications would include crushed fused alumina, alumina balls and crushed and sized silicon carbide.

Prior to the coating application, it is necessary to insure the cleanliness of the internal metal surface to be coated. Metal pipes and similar articles are generally preliminarily cleaned by a conventional wet grinding process. The pipes are then further cleaned by sandblasting or grit-blasting. The wet grinding cleaning operation, however, generally results in the formation of carbonates and hydroxides in the small cracks and crevices of cast iron and ductile iron pipe surfaces. Accordingly, it is necessary to heat such pipes at a temperature above the decomposition point of these carbonates and hydroxides to degas the surface. For these pipes it is sufficient to heat the surface of about 1,000° F. (540° C.) This degassing operation virtually eliminates the possibility of voids or pinholes in the resulting polymer coating.

Following the degassing operation, the pipe is cooled to a temperature above the melting point of the olefin polymer or copolymer component of the coating mixture and rotated about its longitudinal axis. The speed of rotation should be such as to prevent tumbling of the coating mix.

The relationship between the speed of rotation (r.p.m.), pipe diameter and the g (gravity) forces is defined by the formula:

$$g = \frac{N^2 \text{ Dia.}}{70{,}500}$$

wherein g = units of acceleration due to gravity = 32.2 ft. per sec. per sec. at standard conditions n = spinning speed, r.p.m.

Dia. = diameter, inches.

The filler-polymer mix must remain on the interior pipe wall at the point of deposition. This requires that the pipe being lined must be rotated at an r.p.m. sufficient to impart a force equivalent to at least one g force on the particles. It is to be understood that the method is operable at any g force greater than one.

Thus, for the pipe exemplified in Example I below, the calculated r.p.m. for 1 g would be 43.5.

A tiltable, U or V-shaped trough filled with the coating mix, is then positioned within the internal cylindrical surface. The trough generally contains sufficient material to form the coating of a desired thickness. The trough is tilted at a rate such that the coating material is evenly distributed over the entire surface to be coated with that the centrifugal force of the rotating pipe insures that the coating mix remains stationary with respect to the internal metal surface at the point of deposition. The polymer or copolymer component of the mixture melts forming a substantially stationary filler containing matrix which is then allowed to cool to form a solid, filler containing coating. The pipe is then ejected and, if desired, a second pipe section to be coated is then positioned for coating.

EXAMPLE 1

A 36" nominal diameter ductile iron pipe (38.30" actual outside diameter, 37.30" actual inside diameter) 20 feet long, 0.50" wall thickness manufactured in accordance with ANSI Specification A21.51 was used in this example. After heat treatment, the interior surfaces of the pipe were rough ground using a rotating grinding rock. Water was admitted to the inside of the pipe to cool the grind rock and to flush out the foreign particles.

The pipe was then sand blasted on its interior surface and heated to 540° C. to degas the surfaces. The pipe was allowed to cool to 288° C. plus or minus 28° C.; utilizing a hand held water spray to force cool the pipe if one part became hotter than the remainder.

A mechanical mixture of 25% by weight of sand (AFS Grain Fineness No. 83.3) (50 mesh) and 75% by weight of polyethylene powder (density - 0.916; melt index - 22; size - 35 mesh; containing ½% by weight carbon black was placed in a rotatable trough of the same length as the pipe. The pipe was rotated about its longitudinal axis at a rate of 60 r.p.m. (which produces a "g" force of 1.90). The trough was filled to a level to insure a final thickness coating of 0.04 to 0.05 inches. The rotation of the pipe was such to insure a prevention of tumbling during the coating operation. The trough was rotated at a rate to insure even distribution of the sand-polyethylene mix over the entire interior surface of the pipe. After the material is completely fused, water is applied to the outer surface and the pipe and lining cooled before rotation is stopped.

The thus coated pipe was tested by totally immersing the pipe in water at 77° C. for one year without loss of bond. The pipe was further tested by cooling ring portions thereof to −23° C. and then heating to 60° C. on a daily basis for 60 cycles per day without loss of adhesion.

What is claimed is:

1. A method of forming a filled polymer coating on an internal, cylindrical, metal surface comprising:

(a) providing a homogenous mixture of particles of a low or medium density polyethylene or other olefin polymer or copolymer and particles of an inert filler having a particle size in the range of from about 4 mesh to about 325 mesh, the weight ratio of polymer to filler ranging from about 1:2 to about 10:1 within the space defined by an internal, cylindrical, metal surface which is rotating about its longitudinal axis, said internal, metal surface being at a temperature above the melting point of said polyethylene, olefin polymer or copolymer, but below the melting or decomposition point of said filler, (b) uniformly depositing said mixture of particles on said hot, rotating, internal metel surface at a rate such that the mixture is held substantially stationary at the point of deposition with respect to the internal metal surface by the centrifugal force of the rotating cylindrical surface whereby the polymer or copolymer component of the mixture melts to form a viscous, filled film which remains substantially stationary with respect to said internal metal surface by reason of said centrifugal force; and, (c) cooling said coating to a temperature below the melting point of said polyethylene, olefin polymer or copolymer.

2. The method of claim 1 wherein said metal surface is aluminum.

3. The method of claim 1 wherein said metal surface is steel.

4. The method of claim 1 wherein said metal surface is copper.

5. The method of claim 1, wherein said metal surface is cast iron or ductile iron.

6. The method of claim 1 wherein said mixture comprises a low or medium density polyethylene.

7. The method of claim 6 wherein said olefin polymer is a low density polyethylene.

8. The method of claim 6 wherein said olefin polymer is polypropylene.

9. The method of claim 1 wherein said mixture comprises an olefin copolymer.

10. The method of claim 9 wherein said olefin copolymer is ethylene-vinyl acetate copolymer.

11. The method of claim 1 wherein said filler is sand, alumina, cement, zircon or silicon carbide.

12. The method of claim 1 wherein the particle size of said polyethylene, olefin polymer or copolymer is in the range of from about 10 mesh to about 325 mesh.

13. The method of claim 1 wherein said mixture is deposited on said internal surface by means of a tiltable, U or V-shaped trough positioned within the space defined by said internal cylindrical surface.

14. The method of claim 1 wherein the thickness of said coating is in the range of from about 0.005 inch to about 0.5 inch.

15. The method of claim 1 including the step of preliminary cleaning said internal surface by sand blasting and heating said surface to a temperature sufficient to degas the surface thereof.

16. The method of claim 1 wherein said mixture comprises low density polyethylene and about 25% by weight of sand, based on the weight of the mixture.

17. The method of claim 1 wherein the relationship between the rate of rotation, cylindrical diameter and centrifugal force is defined by the formula:

$$g = \frac{N^2 \text{ Dia.}}{70{,}500}$$

wherein g = units of acceleration due to gravity = to 32.2 ft. per sec. per sec. at standard conditions n = spinning speed of cylindrical surface in r.p.m.

Dia. = cylindrical diameter in inches and the cylindrical surface is rotated at an r.p.m. sufficient to impart a force equivalent to at least 1g force on the said particles.

* * * * *